(12) United States Patent
Chang et al.

(10) Patent No.: US 10,564,500 B2
(45) Date of Patent: Feb. 18, 2020

(54) PIXEL STRUCTURE WITH MULTILAYERED COMMON ELECTRODES AND TOUCH PANEL THEREOF

(71) Applicant: Au Optronics Corporation, Hsinchu (TW)

(72) Inventors: Che-Chia Chang, Hsinchu (TW); Ming-Hung Chuang, Tainan (TW); Shin-Shueh Chen, Hsinchu County (TW)

(73) Assignee: Au Optronics Corporation, Hsinchu (TW)

( * ) Notice: Subject to any disclaimer, the term of this patent is extended or adjusted under 35 U.S.C. 154(b) by 0 days.

(21) Appl. No.: 16/029,661

(22) Filed: Jul. 9, 2018

(65) Prior Publication Data

US 2019/0302554 A1    Oct. 3, 2019

(30) Foreign Application Priority Data

Mar. 30, 2018  (TW) .............................. 107111128 A (51) Int. Cl.
*G06F 3/041* (2006.01)
*G02F 1/1362* (2006.01)
(Continued)

(52) U.S. Cl.
CPC ...... *G02F 1/136286* (2013.01); *G02F 1/1368* (2013.01); *G02F 1/13338* (2013.01);
(Continued)

(58) Field of Classification Search
CPC ......... G02F 1/136286; G02F 1/133345; G02F 1/13338; G02F 1/136227
(Continued)

(56) References Cited

U.S. PATENT DOCUMENTS 9,823,528 B2    11/2017  Tsai et al.
2010/0025664 A1  2/2010  Park
(Continued)

FOREIGN PATENT DOCUMENTS

| CN | 104133328 | 11/2014 |
|---|---|---|
| CN | 104280951 | 1/2015 |
| CN | 104423110 | 3/2015 |
| CN | 106444198 | 2/2017 |
| WO | 2016045423 | 3/2016 |

*Primary Examiner* — Jonathan M Blancha
(74) *Attorney, Agent, or Firm* — JCIPRNET (57) ABSTRACT

A pixel structure includes a scan line, a data line, a switching element, a planarization layer, a first common electrode, a common line, a first insulating layer, a pixel electrode, a second insulating layer, and a second common electrode. The switching element includes a source and a drain. The common line is located on the planarization layer and directly connected with the first common electrode. The planarization layer is located on the scan line, the data line, and the switching element. The pixel electrode is electrically connected with the drain through a first contact hole, wherein the first contact hole penetrates through the planarization layer and the first insulating layer. The second common electrode is electrically connected with the first common electrode through a second contact hole, wherein the second contact hole penetrates through the first insulating layer and the second insulating layer. A touch panel is also provided.

11 Claims, 5 Drawing Sheets

(51) Int. Cl.
*G02F 1/1333* (2006.01)
*G02F 1/1368* (2006.01)
*G09G 3/36* (2006.01)

(52) U.S. Cl.
CPC .. *G02F 1/133345* (2013.01); *G02F 1/136227* (2013.01); *G06F 3/0412* (2013.01); *G02F 2001/133357* (2013.01); *G02F 2201/121* (2013.01); *G09G 3/3648* (2013.01); *G09G 2320/0247* (2013.01)

(58) Field of Classification Search
USPC ........................................................ 345/173
See application file for complete search history.

(56) References Cited

U.S. PATENT DOCUMENTS

| | | | | |
|---|---|---|---|---|
| 2011/0316809 | A1* | 12/2011 | Kim ...................... | G06F 3/0412 345/174 |
| 2012/0038585 | A1* | 2/2012 | Kim ...................... | G06F 3/0412 345/174 |
| 2015/0060973 | A1* | 3/2015 | Tsai .................. | G02F 1/136213 257/309 |
| 2016/0011476 | A1* | 1/2016 | Park .................. | G02F 1/134309 349/47 |
| 2016/0187693 | A1* | 6/2016 | Woo .................... | G02F 1/13338 257/72 |
| 2016/0195785 | A1* | 7/2016 | Kimura ............. | G02F 1/134363 349/43 |

\* cited by examiner

PIXEL STRUCTURE WITH MULTILAYERED COMMON ELECTRODES AND TOUCH PANEL THEREOF

CROSS-REFERENCE TO RELATED APPLICATION

This application claims the priority benefit of Taiwan application Ser. No. 107111128, filed on Mar. 30, 2018. The entirety of the above-mentioned patent application is hereby incorporated by reference herein and made a part of this specification.

BACKGROUND

1. Field of the Invention

This disclosure is related to a pixel structure and a touch panel, especially related to a pixel structure including a first common electrode and a second common electrode as well as a touch panel comprising the pixel structures.

2. Description of Related Art

With the advancement of technology, the power consumption of liquid crystal display (LCD) panels has been widely discussed. The research results show that when the operation frequency of the LCD panel is down-converted, the lower frequency of the signal output can achieve energy-saving effects.

However, when the liquid crystal display panel is operated at a low frequency (for example, less than 60 Hz), it is easy to cause a drop in the frame's brightness, which can be recognized by human eyes, because of the leakage of the pixel structures. When charging is performed on the next frame, the brightness will be increased significantly to generate the flicker problem. Therefore, there is an urgent need to have a solution that can solve the problems above.

SUMMARY

According to one embodiment of this invention, a pixel structure is provided to improve the flicker problem of an LCD panel operated at a low frequency.

According to another embodiment of this invention, a touch panel is provided to improve the flicker problem of an LCD panel operated at a low frequency.

In at least one embodiment of this invention, a pixel structure is provided. The pixel structure comprises a scan line, a data line, a switching element, a planarization layer, a first common electrode, a common line, a first insulating layer, a pixel electrode, a second insulating layer, and a second common electrode. The switching element is electrically connected to the scan line and the data line. The switching element includes a source and a drain. The planarization layer is located on the scan line, the data line, and the switching element. The first common electrode is located on the planarization layer. The common line is located on the planarization layer and directly connected with the first common electrode. The pixel electrode is located on the first insulating layer. The pixel electrode is electrically connected with the drain through a first contact hole. The first contact hole penetrates through the planarization layer and the first insulating layer. The second insulation layer is located on the pixel electrode. The second common electrode is located on the second insulation layer. The second common electrode is electrically connected with the first common electrode through a second contact hole. The second contact hole penetrates through the first insulating layer and the second insulating layer.

In at least one embodiment of this invention, a touch panel is provided. The touch panel comprises a first pixel structure and a second pixel structure. Each of the first and the second pixel structures comprises a scan line, a data line, a switching element, a planarization layer, a first common electrode, a common line, a first insulating layer, a pixel electrode, a second insulating layer, and a second common electrode. The switching element is electrically connected to the scan line and the data line. The switching element includes a source and a drain. The planarization layer is located on the scan line, the data line, and the switching element. The first common electrode is located on the planarization layer. The common line is located on the planarization layer and directly connected with the first common electrode. The pixel electrode is located on the first insulating layer. The pixel electrode is electrically connected with the drain through a first contact hole. The first contact hole penetrates through the planarization layer and the first insulating layer. The second insulation layer is located on the pixel electrode. The second common electrode is located on the second insulation layer. The second common electrode is electrically connected with the first common electrode through a second contact hole. The second contact hole penetrates through the first insulating layer and the second insulating layer. The common line of the first pixel electrode and the common line of the second pixel electrode are separated from each other.

One aspect of this invention is to improve the flicker problem of an LCD panel operated at a low frequency.

Another aspect of this invention is to increase the aperture ratio of a pixel structure.

To make the above features and advantages of the present invention more obvious and easy to understand, the following embodiments will be described in detail with the accompanying drawings as follows.

DESCRIPTION OF THE EMBODIMENTS

Figure 1A:
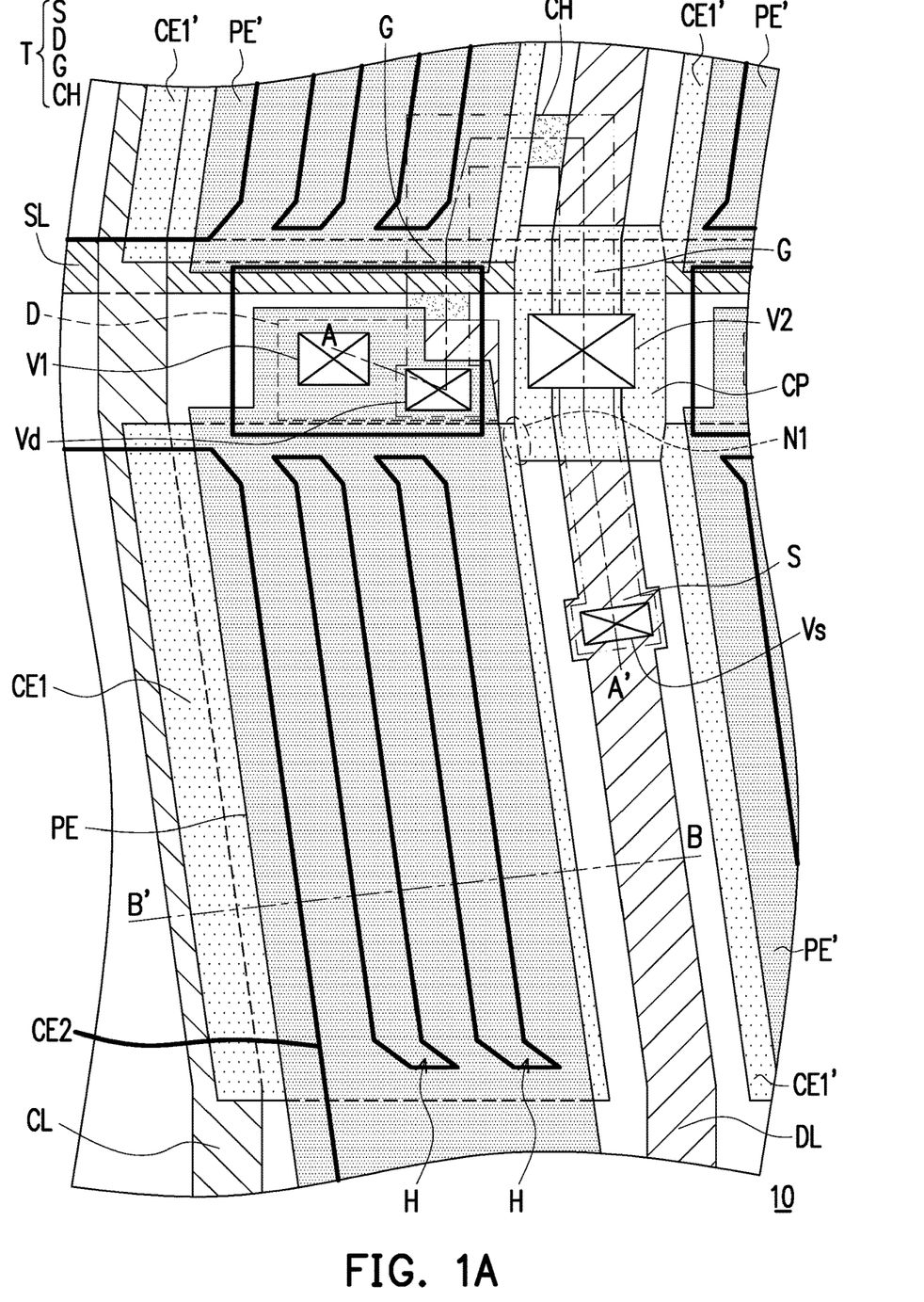
FIG. 1A is a schematic top view of a pixel structure and its surrounding components according to an embodiment of the present invention.
Figure 1B:
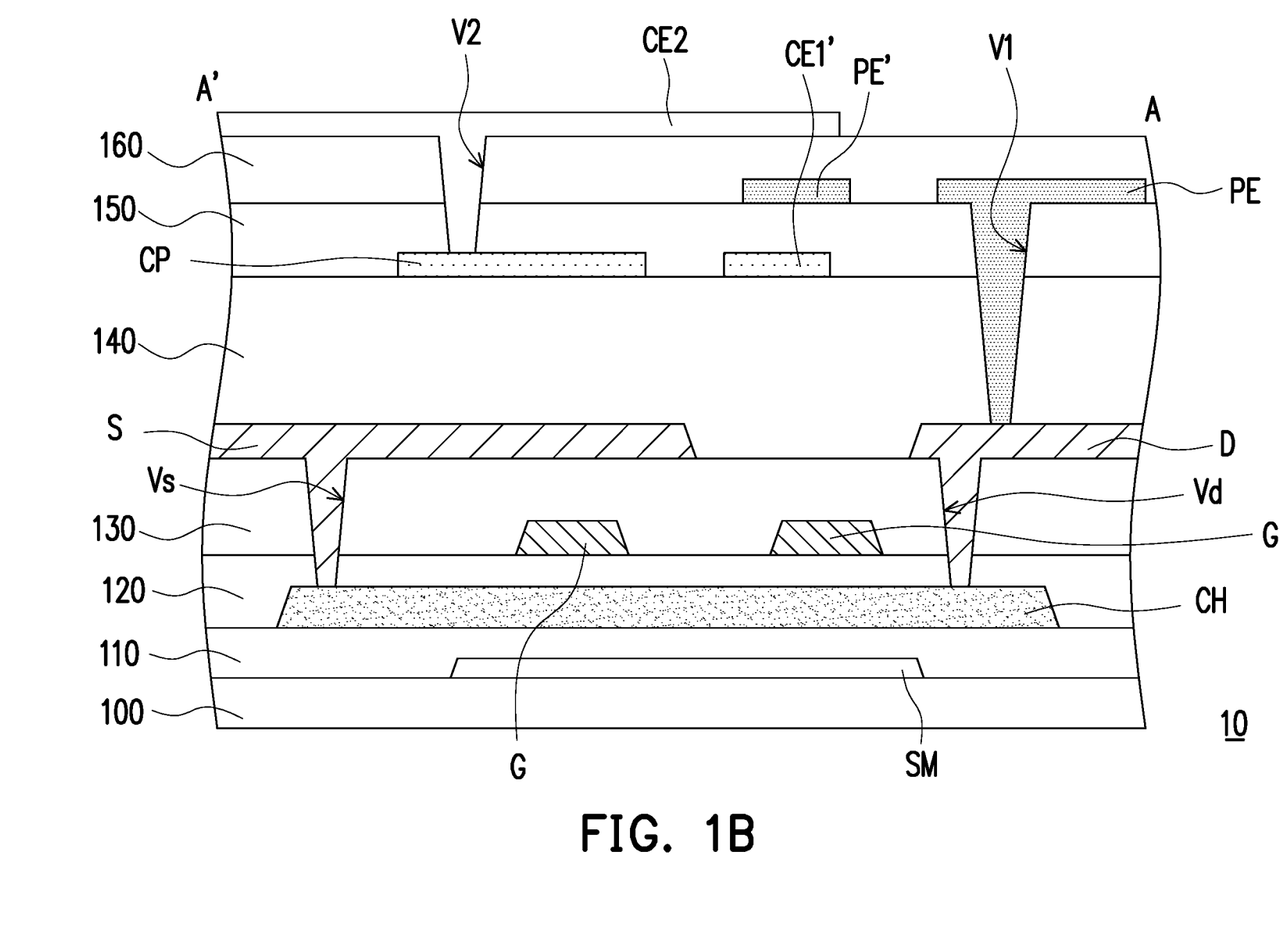
FIG. 1B is a schematic cross-sectional view of a pixel structure according to the section line AN of FIG. 1A.
Figure 1C:
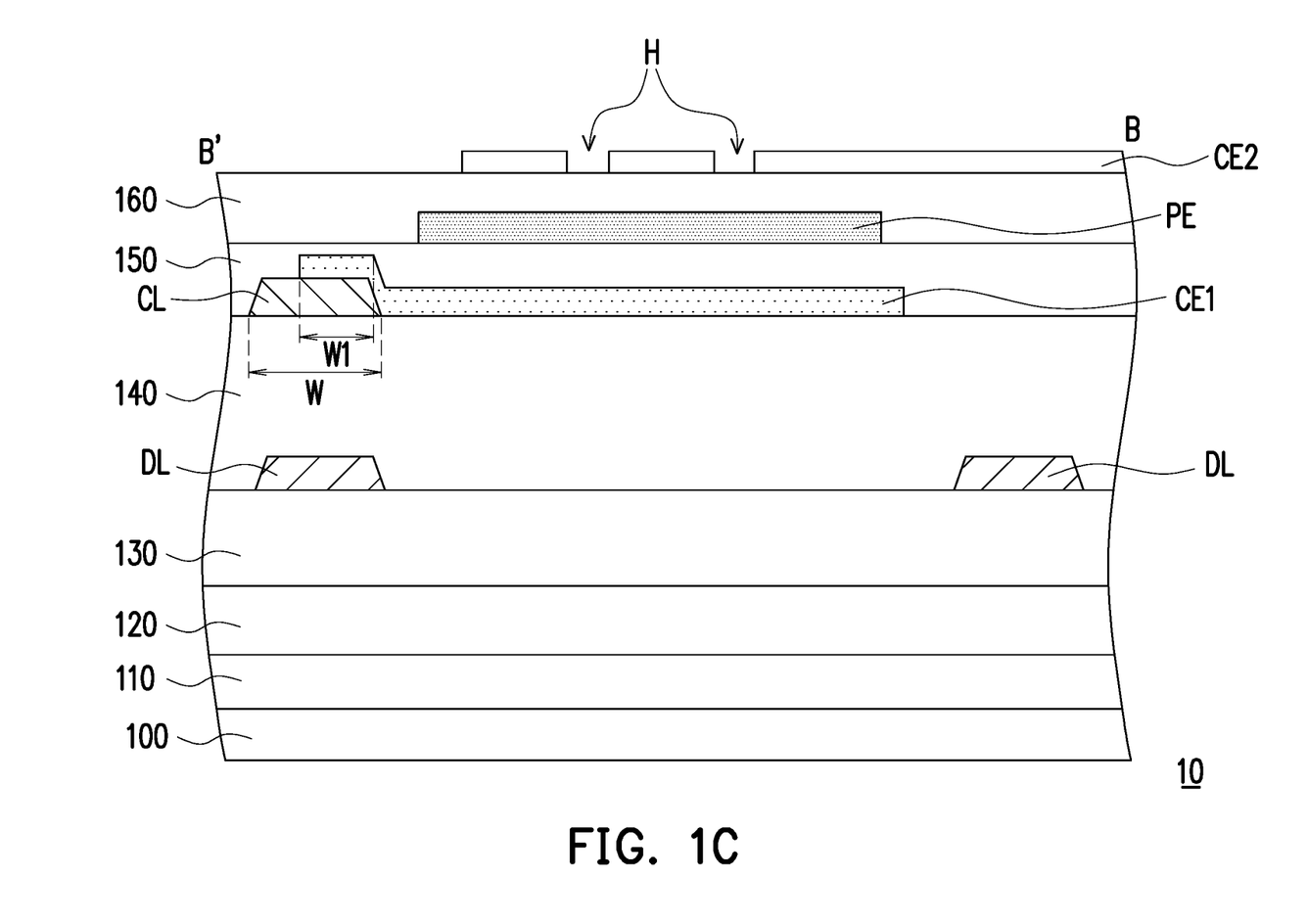
FIG. 1C is a schematic cross-sectional view of a pixel structure according to the section line BB' of FIG. 1A.

FIG. 1A is a schematic top view of a pixel structure and its surrounding components in accordance with an embodiment of the present invention. FIG. 1B is a schematic cross-sectional view of a pixel structure according to the section line AA'of FIG. 1A. FIG. 1C is a schematic cross-sectional view of a pixel structure according to the section line BB' of FIG. 1A.

Please refer to FIGS. 1A to 1C. The pixel structure 10 comprises a scan line SL, a data line DL, a switching element T, a planarization layer 140, a first common electrode CE1, a common line CL, a first insulating layer 150, a pixel electrode PE, a second insulating layer 160, and a second common electrode CE2. In this embodiment, the pixel structure 10 further comprises a substrate 100, a light shielding layer SM, a buffer layer 110, a gate insulating layer 120, and an interlayer dielectric layer 130, but the invention is not limited thereto. In FIG. 1A, three first common electrodes CE1' and three pixel electrodes PE' are also depicted. The first common electrode CE1' and the pixel electrode PE' are components of other pixel structures adjacent to the pixel structure 10. The buffer layer 110 is located on the substrate 100. The material of the buffer layer 110 is an insulating material, for example.

The switching element T has a source S, a drain D, a gate G, and a channel CH. The channel CH is located on the buffer layer 110. The gate G overlaps the channel CH, and a gate insulating layer 120 is sandwiched between the gate G and the channel CH. The gate G is electrically connected to the scan line SL. The material of the gate G is a conductive material. For example, the material of the gate G may be copper (Cu), molybdenum (Mo), titanium (Ti), aluminum (Al), a tungsten, tungsten (W), silver (Ag), gold (Au), alloys of the above metals, or any combinations thereof. The gate G may be a single-layer structure or a multi-layer structure. In this embodiment, the switching element T is a double-gate switching element. That is, the switching element T comprises two gates G, whereby the leakage current can be reduced. However, the present invention is not limited thereto. According to other embodiments, the switching element T may also be a single-gate switching element.

The interlayer dielectric layer 130 covers the gate insulating layer 120 and the gate G at the same time. That is, the gate G is located between the interlayer dielectric layer 130 and the gate insulating layer 120.

The drain D and the source S are on the interlayer dielectric layer 130. The through hole Vd is located in the interlayer dielectric layer 130 and the gate insulating layer 120, and the through hole Vs is located in the interlayer dielectric layer 130 and the gate insulating layer 120. The drain D is electrically connected to the channel CH through the through hole Vd, and the source S is electrically connected to the channel CH through the through hole Vs. The source S is electrically connected to the data line DL. The drain electrode D is electrically connected to the pixel electrode PE. In some embodiments, other elements (not shown) are also included between the switch element T and the pixel electrode PE, but the invention is not limited thereto. In the present embodiment, the switching element T is described by taking the top gate type thin film transistor (TFT) as an example, but the present invention is not limited thereto. According to other embodiments, the above-mentioned switching element T may also be a bottom gate type TFT.

In the present embodiment, a light shielding layer SM is sandwiched between the switching element T and the substrate 100. The light shielding layer SM is used to prevent the light from being irradiated on the channel CH of the switching element T and affecting the normal operation of the charge carrier in the switching element T, thereby preventing the leakage current from being generated. The material of the light-shielding layer SM may be selected from a material having a light-shielding effect, such as a metal, a metal compound (eg, silver halide), a resin, or other suitable materials.

The scan line SL and the data line DL intersect, and an interlayer dielectric layer 130 is sandwiched between the scan line SL and the data line DL. In this embodiment, it is assumed that the extending direction of the scan line SL is not parallel to the extending direction of the data line DL. A metal material is generally used for the scan line SL and the data line DL, but the present invention is not limited thereto. In other embodiments, the scan lines SL and the data lines DL may also use other conductive materials, such as a metal nitride, a metal oxide, a metal oxynitride, or other suitable conductive materials) or a stacked layer of a metal with other conductive materials.

The planarization layer 140 is located on the scan line SL, the data line DL, and the switching element T. The material of the planarization layer 140 comprises an inorganic material, an organic material, other suitable materials, or any combinations thereof. The inorganic material may be silicon oxide, silicon nitride, silicon oxynitride, other suitable materials, or a stacked layer of at least two materials above, for example. The organic material may be a polyester (PET), poly olefins, polyacryls, polycarbonates, polyalkylene oxides, polyphenylenes, polyethers, polyketones, polyalcohols, polyaldehydes, other suitable materials, or any combinations thereof.

The first common electrode CE1 is located on the planarization layer 140. The first common electrode CE1 contacts a corner N1 of the connecting portion CP. The first common electrodes CE1' of other pixel structures around the pixel structure 10 contacts other corners of the connecting portion CP. The connecting portion CP overlaps a part of the data line DL. The connecting portion CP is, for example, integrally formed with the first common electrode CE1. For example, the connecting portion CP and the first common electrode CE1 are patterned from the same film layer. A corner of the connecting portion CP contacts the first common electrode CE1.

The common line CL is located on the planarization layer 140, and the first insulating layer 150 is located on the first common electrode CE1 and the common line CL. The common line CL is directly connected with the first common electrode CE1. For example, the common line CL is in direct contact with the first common electrode CE1. After the common line CL is formed on the planarization layer 140, the first common electrode CE1 is formed on the common line CL and is in direct contact with the common line CE1. After that, a first insulating layer 150 is formed. The first insulating layer 150 covers the first common electrode CE1 and the common line CL. In this embodiment, since the common line CL and the first common electrode CE1 are not electrically connected by, for example, a contact bump or another through holes, the aperture ratio of the pixel structure 10 can be improved and the process yield of the picture structure can be improved. The common line CL is electrically connected to the connecting portion CP through the first common electrode CE1. The line width of the common line CL is W, and the width of the portion of the common line CL covered by the first common electrode CE1 is W1, where 0<W1<W. The first common electrode CE1 is, for example, covering a sidewall and a portion of the upper surface of the common line CL. In the present embodiment, at least one of the common line CL and the first common electrode CE1 overlaps the data line DL. For example, the common line CL and the first common electrode CE1 overlap with the data line DL, but the invention is not limited thereto.

The pixel electrode PE is located on the first insulating layer 150. The first insulating layer 150 is sandwiched between the pixel electrode PE and the first common electrode CE1. The first contact hole V1 penetrates the planarization layer 140 and the first insulating layer 150. The pixel electrode PE is electrically connected to the drain D through the first contact hole V1. In the present embodiment, the pixel electrode PE and the data line DL are separated by the first common electrode CE1, so that the parasitic capacitance between the pixel electrode PE and the data line DL can be reduced to improve the flicker problem of the display device when the pixel structure is operated at low frequency.

The second insulating layer 160 is on the pixel electrode PE and the first insulating layer 150.

The second common electrode CE2 is located on the second insulating layer 160. A second insulating layer 160 is sandwiched between the second common electrode CE2 and the pixel electrode PE. The second contact hole V2 penetrates the first insulating layer 150 and the second insulating layer 160. The second common electrode CE2 is electrically connected to the connecting portion CP through the second contact hole V2, and is electrically connected to the first common electrode CE1 through the connecting portion CP. In this embodiment, the second common electrode CE2 and the second contact hole V2 are all overlapped with the data line DL, thereby reducing the influence of the second contact hole V2 on the aperture ratio of the pixel structure 10, but the present invention is not limited thereto. In this embodiment, the second common electrode CE2 does not overlap with the first contact hole V1 and through hole Vd, but the invention is not limited thereto. The second common electrode CE2 has a plurality of slits H, and the slits H overlap the pixel electrode PE and the first common electrode CE1. In this embodiment, the second common electrode CE2 and the first common electrode CE1 respectively disposed above and below the pixel electrode PE enable the pixel structure 10 to have a larger effective area and further have larger storage capacitance, so that the flicker problem of the display device can be improved when the pixel structures operate at low frequencies. For example, supposing that the pixel structure 10 of the present embodiment is operated at a low frequency of 15 Hz and when Nth frame is displayed, the speed and amplitude of the decrease in brightness of the frame can be controlled to be smaller because of having a sufficiently large storage capacitance. When the next frame, that is, the N+1 th frame is displayed, the pixel structures are charged for display, the difference in brightness between the N+1th frame and the Nth frame is less noticeable, thereby reducing or eliminating the flicker phenomenon felt by human eyes.

In at least one embodiment of the present invention, the parasitic capacitance on the pixel electrode can be reduced and the storage capacitance can be increased, thereby improving the problem of the flicker of the display device when the pixel structure is operated at a low frequency.

Figure 2A:
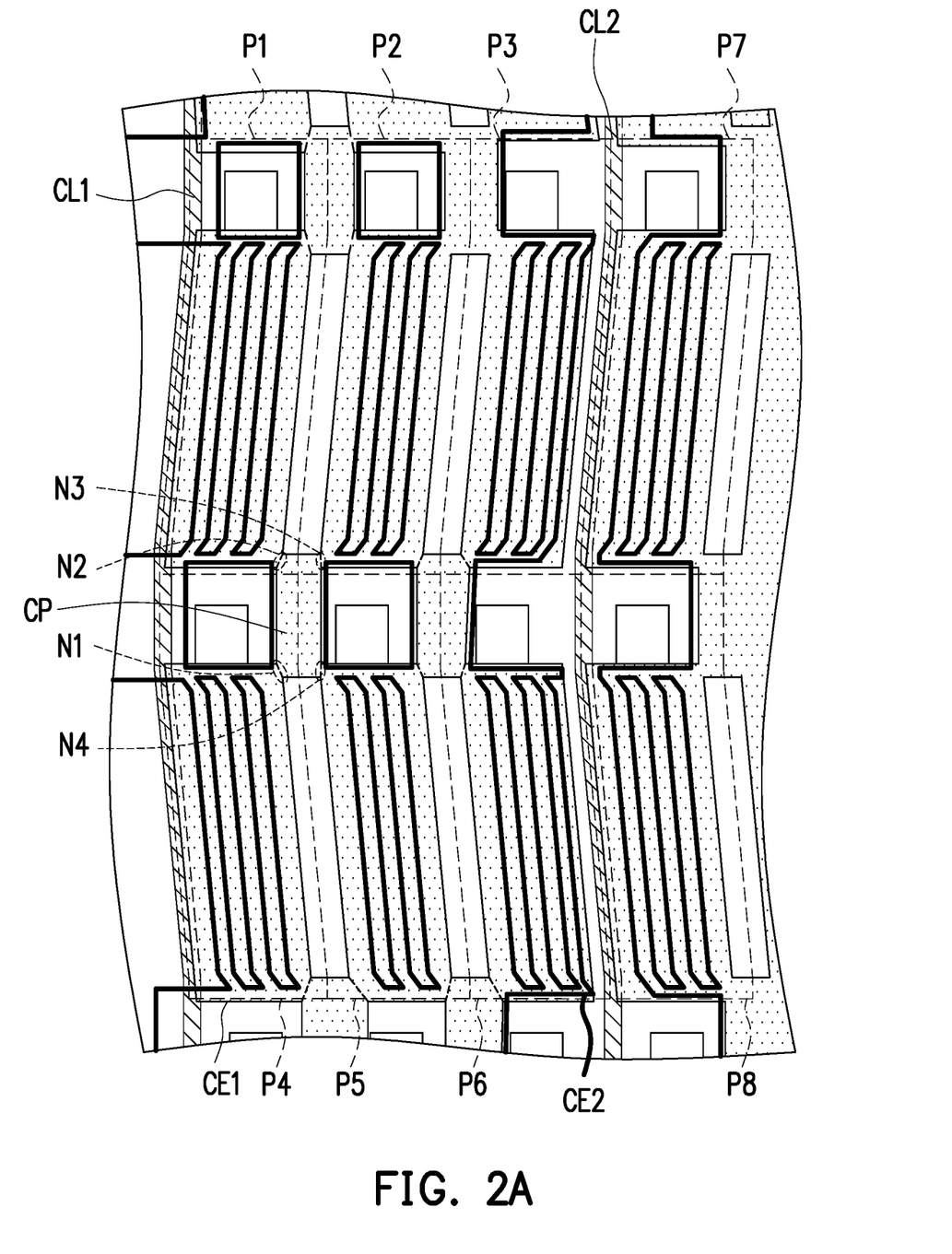
FIG. 2A is a schematic top view of some components of a touch panel according to an embodiment of the present invention.
Figure 2B:
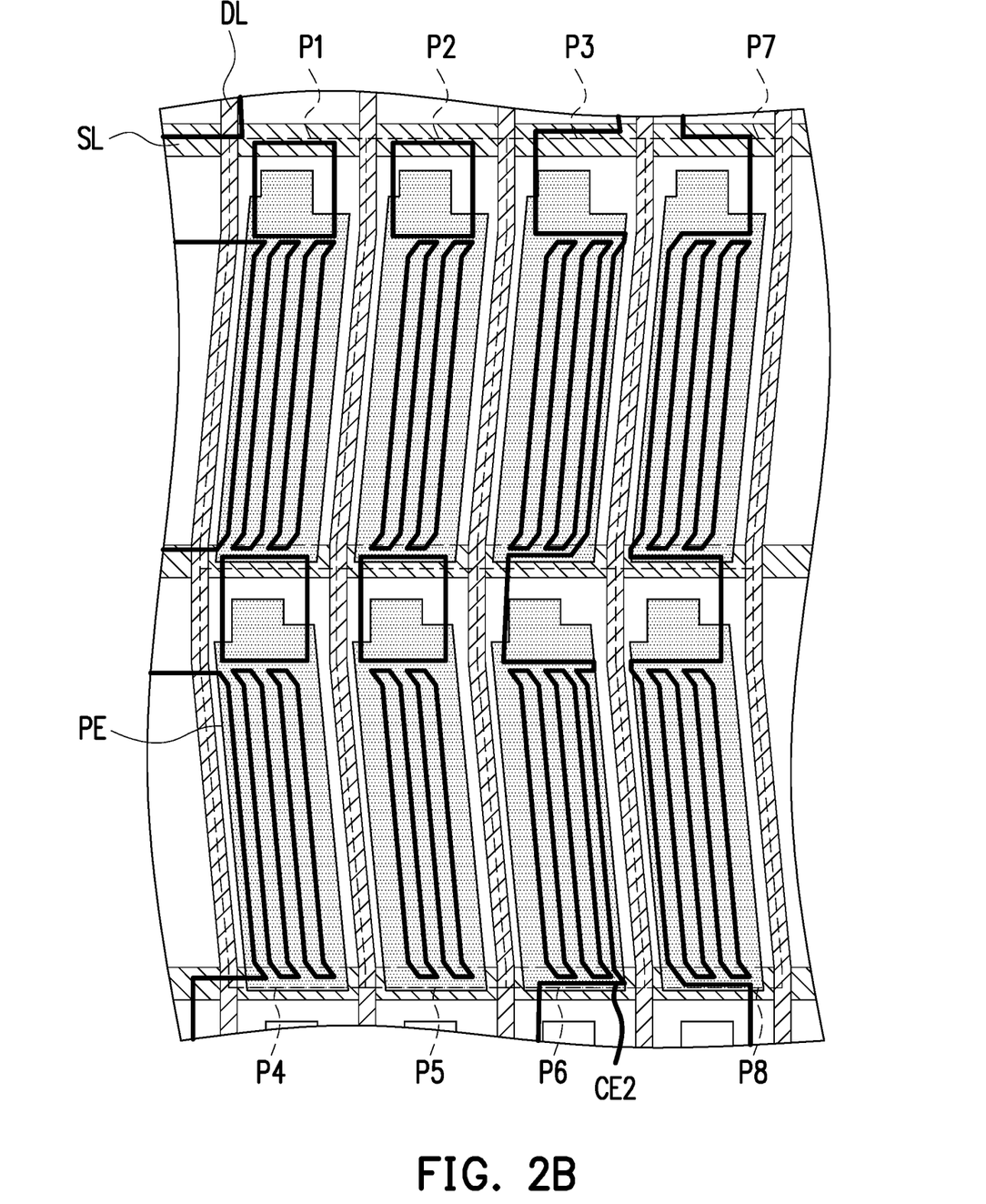
FIG. 2B is a schematic top view of some components of a touch panel according to an embodiment of the present invention.

FIG. 2A is a top view of some components of a touch panel according to an embodiment of the invention. FIG. 2B is a schematic top view of some components of a touch panel according to an embodiment of the present invention. It must be explained here that the embodiments of FIGS. 2A and 2B follow the reference numerals and partial components of the embodiment of FIGS. 1A to 1C, wherein the same or similar reference numerals are used to denote the same or similar components, and the descriptions of the same technical content are omitted. The omitted descriptions will not be repeated in the following embodiments, and may refer to the foregoing embodiment.

Please refer to FIG. 2A and FIG. 2B. For convenience of description, FIG. 2A illustrates a first common electrode CE1, a second common electrode CE2, a connecting portion CP, a common line CL1, and a common line CL2 in the pixel structures P1 to P8, and other components are omitted. FIG. 2B illustrates the scan lines SL, the data lines DL, the pixel electrodes PE, and the second common electrode CE2 of the pixel structures P1-P8, and the other components are omitted.

Please refer to FIG. 2A and FIG. 2B. The touch panel of this embodiment at least comprises a pixel structure P7 and a pixel structure P1. In some embodiments, the touch panel further includes pixel structures P2-P6 and P8. The plurality of scan lines SL and the plurality of data lines DL are interlaced with each other, and the structure of the pixel structures P1-P8 is similar to the pixel structure 10 in the embodiment of FIGS. 1A-1C.

The first common electrodes CE1 of the pixel structures P1-P6 are electrically connected to each other through connecting portions CP. The first common electrodes CE1 of the pixel structures P7-P8 are electrically connected to each other through the connecting portion CP. Referring to FIGS. 1A, 2A and 2B at the same time, the connecting portion CP has corners N1, N2, N3, and N4. The corners N1, N2, N3, and N4 of the connecting portion CP are respectively connected to the first common electrodes CE1 of four adjacent pixel structures. In this embodiment, the two corners N2 and N1 of the connecting portion CP are respectively connected to the first common electrode CE1 of the pixel structure P1 and the first common electrode CE1 of the pixel structure P4 of the same column, and the other two corners N3 and N4 are respectively connected the first common electrode CE1 of the pixel structure P2 and the first common electrode CE1 of the pixel structure P5 of the other column. In this embodiment, a plurality of connecting portions CP are provided. A single connecting portion CP corresponds to four adjacent pixel structures and is electrically connected to the four adjacent pixel structures through the four corners N1, N2, N3, and N4 of the connection portion CP, respectively, but the invention is not limited thereto. In the present embodiment, a single first common electrode CE1 corresponds to four connecting portions CP. For example, a single first common electrode CE1 is in contact with corners of four connecting portions CP, but not limited thereto. In this embodiment, the connecting portions CP are respectively overlapped with the intersections of the scanning lines SL and the data lines DL, but is not limited thereto.

In the present embodiment, each of the pixel structures P1 and P4 comprises the common line CL1, and each of the pixel structures P7 and P8 comprises the common line CL2. In this embodiment, each of the pixel structures P2, P3, P5, and P6 does not comprise common line. Each of the pixel structures P2, P3, P5, and P6 is electrically connected to the common line CL1 through the first common electrode CE1 of the pixel structure P1 or the pixel structure P4, but the present invention is not limited thereto. In some embodiments, each of the pixel structures P2, P3, P5, and P6 comprises common line CL1. The first common electrode CE1 of each of the pixel structures P7 and P8 is electrically connected to the common line CL2.

In the present embodiment, the common line CL2 of the pixel structure P7 and the common line CL1 of the pixel structure P1 are separated from each other.

In the present embodiment, the pixel structure P4 is adjacent to the pixel structure P1. The common line CL1 of the pixel structure P4 is directly connected to the common line CL1 of the pixel structure P1.

In the present embodiment, since the common line CL1 and the common line CL2 are separated from each other, the first common electrodes CE1 and/or the second common electrodes CE2 of the pixel structures P1 to P6 and the first electrodes CE1 and/or the second common electrodes CE2 of the pixel structures P7 to P8 can be used as touch electrodes. In this embodiment, the common line CL1 and/or the common line CL2 can be made of a conductive material that is not easily deteriorated by heat, such as aluminum, titanium, molybdenum, magnesium, neodymium, silver, other suitable materials, or a combination of at least two of the above. In addition, the common line CL1 and/or the common line CL2 may be made of a low-reflective metal (eg, a blackened metal layer) to enhance optical performance. In various embodiments, a material of each of the first common electrode CE1, the second common electrode CE2, the connecting portion CP, and the pixel electrode PE is exemplified by a transparent conductive material such as indium tin oxide or indium zinc oxide. An LCD panel comprises the touch panel of at least one embodiment disclosed above, an opposite substrate and a liquid crystal layer. The liquid crystal layer is disposed between the touch panel and opposite substrate.

In at least one embodiment of the present invention, the parasitic capacitance can be reduced and the storage capacitance can be increased, thereby improving the problem of the screen flicker when the touch panel operates at low frequencies. The touch panel is provided to improve the flicker problem of the LCD panel operated at a low frequency.

In summary, in the pixel structure and the touch panel of the present invention, the first common electrode is in direct contact with the common line, the pixel electrode and the data line are separated by the first common electrode, and the second common electrode and the pixel electrode are structures of different layers. Therefore, the parasitic capacitance can be reduced and the storage capacitance can be increased, thereby improving the pixel structure and the flicker problem when the touch panel is operated at low frequencies.

Although the present invention has been disclosed by way of example above, it is not intended to limit the present invention. Any person of ordinary skill in the art can make some changes and changes without departing from the spirit and scope of the present invention. In the case of retouching, the scope of protection of the present invention shall be subject to the definition of the appended patent scope.

What is claimed is:

1. A pixel structure, comprising:
    a scan line and a data line;
    a switching element electrically connected to the scan line and the data line, wherein the switching element includes a source and a drain;
    a planarization layer disposed on the scan line, the data line and the switching element;
    a first common electrode disposed on the planarization layer, wherein the first common electrode contacts a corner of a connecting portion, and the connecting portion overlaps a portion of the data line and a portion of the scan line;
    a common line disposed on the planarization layer and directly connected with the first common electrode;
    a first insulating layer disposed on the first common electrode and the common line;
    a pixel electrode disposed on the first insulating layer and electrically connected to the drain through a first contact hole, wherein the first contact hole penetrates the planarization layer and the first insulating layer;
    a second insulating layer disposed on the pixel electrode; and
    a second common electrode disposed on the second insulating layer and electrically connected to the first common electrode through a second contact hole, wherein the second common electrode has a plurality of slits, and the slits overlap the pixel electrode and the first common electrode, and the second contact hole penetrates the first insulating layer and the second insulating layer.

2. The pixel structure of claim 1, wherein a line width of the common line is W, and a width of a portion of the common line covered by the first common electrode is W1, and 0<W1<W.

3. The pixel structure of claim 1, wherein the second common electrode overlaps the data line.

4. The pixel structure of claim 1, wherein the second contact hole overlaps the data line.

5. The pixel structure of claim 1, wherein at least one of the common line and the first common electrode overlaps the data line.

6. The pixel structure of claim 1, wherein the common line is electrically connected to the connecting portion through the first common electrode.

7. The pixel structure of claim 1, wherein the second common electrode does not overlap with the first contact hole.

8. A touch panel, comprising:
    a first pixel structure having the pixel structure of claim 1; and
    a second pixel structure having the pixel structure of claim 1, wherein the common line of the first pixel electrode and the common line of the second pixel electrode are separated from each other.

9. The touch panel of claim 8, further comprising a third pixel structure having the pixel structure of claim 1, wherein the third pixel structure is adjacent to the second pixel structure, and the common line of the third pixel structure is directly connected to the common line of the second pixel structure.

10. The touch panel of claim 9, further comprising a connecting portion, wherein two corners of the connecting portion respectively connect the first common electrode of the second pixel structure and the first common electrode of the third pixel structure.

11. The pixel structure of claim 1, wherein both the common line and the data line are extending substantially along a first direction.

* * * * *